(12) United States Patent
Brothers et al.

(10) Patent No.: US 9,771,772 B2
(45) Date of Patent: Sep. 26, 2017

(54) CEMENT BLENDS INCLUDING INERT MICROPARTICLES

(71) Applicant: Halliburton Energy Services, Inc., Houston, TX (US)

(72) Inventors: Lance E. Brothers, Chicksha, OK (US); Ronnie Glen Morgan, Waurika, OK (US); Pauline Akinyi Otieno, Spring, TX (US); Peter James Boul, Houston, TX (US); Kyriacos Agapiou, Houston, TX (US); Thomas J. Pisklak, Cypress, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 14/891,087

(22) PCT Filed: Sep. 20, 2013

(86) PCT No.: PCT/US2013/060867
§ 371 (c)(1),
(2) Date: Nov. 13, 2015

(87) PCT Pub. No.: WO2015/041667
PCT Pub. Date: Mar. 26, 2015

(65) Prior Publication Data
US 2016/0084037 A1 Mar. 24, 2016

(51) Int. Cl.
*E21B 33/14* (2006.01)
*E21B 33/13* (2006.01)
(Continued)

(52) U.S. Cl.
CPC .............. *E21B 33/14* (2013.01); *C04B 22/06* (2013.01); *C04B 28/02* (2013.01); *C09K 8/467* (2013.01); *E21B 33/13* (2013.01); *Y02W 30/96* (2015.05)

(58) Field of Classification Search
None
See application file for complete search history.

(56) References Cited

U.S. PATENT DOCUMENTS 4,452,635 A 6/1984 Noshi et al.
4,676,832 A 6/1987 Childs et al.
(Continued)

FOREIGN PATENT DOCUMENTS

WO 2015041667 A1 3/2015

OTHER PUBLICATIONS

International Search Report and Written Opinion for PCT/US2013/060867 dated Jun. 24, 2014.
(Continued)

*Primary Examiner* — Anuradha Ahuja
(74) *Attorney, Agent, or Firm* — McDermott Will & Emery LLP

(57) ABSTRACT

Methods may comprise providing a cement dry blend comprising a plurality of cement particles and a plurality of inert microparticles, wherein the inert microparticles have an average diameter at least about 3 times smaller than that of the average diameter of the cement particles; mixing water, a set retarding additive, and the cement dry blend to yield a cement slurry; storing the cement slurry; mixing a cement set accelerator into the cement slurry; introducing the cement slurry into a wellbore penetrating a subterranean formation; and allowing the cement slurry to set at a location within the wellbore, the subterranean formation, or both.

17 Claims, 1 Drawing Sheet

(51) Int. Cl.
  *C09K 8/467*  (2006.01)
  *C04B 28/02*  (2006.01)
  *C04B 22/06*  (2006.01)

(56) References Cited

U.S. PATENT DOCUMENTS

| | | | |
|---|---|---|---|
| 5,346,012 A * | 9/1994 | Heathman | C04B 7/527 106/727 |
| 5,346,550 A * | 9/1994 | Kunzi | C04B 28/14 106/708 |
| 5,447,197 A * | 9/1995 | Rae | C04B 28/08 106/728 |
| 6,170,575 B1 | 1/2001 | Reddy et al. | |
| 6,173,778 B1 | 1/2001 | Rae et al. | |
| 6,245,142 B1 | 6/2001 | Reddy et al. | |
| 6,379,456 B1 | 4/2002 | Heathman et al. | |
| 6,478,869 B2 | 11/2002 | Reddy et al. | |
| 6,494,951 B1 | 12/2002 | Reddy et al. | |
| 6,601,647 B2 | 8/2003 | Brothers et al. | |
| 6,610,139 B2 | 8/2003 | Reddy et al. | |
| 6,616,751 B1 * | 9/2003 | Maroy | C04B 24/00 106/696 |
| 6,631,766 B2 | 10/2003 | Brothers et al. | |
| 6,648,961 B2 | 11/2003 | Brothers et al. | |
| 6,660,078 B2 | 12/2003 | Brothers et al. | |
| 6,660,080 B2 | 12/2003 | Reddy et al. | |
| 6,892,814 B2 | 5/2005 | Heathman et al. | |
| 6,907,928 B2 | 6/2005 | Di Lullo Arias et al. | |
| 7,048,054 B2 | 5/2006 | Heathman et al. | |
| 7,086,466 B2 | 8/2006 | Roddy | |
| 7,201,228 B2 | 4/2007 | Robb et al. | |
| 7,399,355 B2 * | 7/2008 | Szymanski | C04B 24/2623 106/696 |
| 7,478,675 B2 | 1/2009 | Roddy et al. | |
| 7,559,369 B2 | 7/2009 | Roddy et al. | |
| 7,617,870 B1 | 11/2009 | Roddy et al. | |
| 7,674,332 B2 | 3/2010 | Roddy et al. | |
| 7,806,183 B2 | 10/2010 | Roddy et al. | |
| 7,892,352 B2 | 2/2011 | Roddy et al. | |
| 2004/0112600 A1 * | 6/2004 | Luke | C04B 14/047 166/295 |
| 2005/0166803 A1 * | 8/2005 | Dillenbeck | C04B 28/02 106/814 |
| 2005/0167105 A1 * | 8/2005 | Roddy | C04B 20/008 166/293 |
| 2008/0020948 A1 | 1/2008 | Rodrigues et al. | |
| 2013/0092376 A1 | 4/2013 | Al-Subhi et al. | |
| 2013/0213638 A1 | 8/2013 | Keller et al. | |
| 2013/0233550 A1 | 9/2013 | Brothers et al. | |
| 2014/0109799 A1 * | 4/2014 | Revil | C04B 28/06 106/676 |

OTHER PUBLICATIONS

"Chapter 2: Silica Fume," R. Siddique and M. Iqbal Khan, Sipplementary Cementing Materials, Engineering Materials, DOI: 10.1007/978-3-642-17866-5_2, (C) Springer-Verlag Berlin Heidelberg 2011, 54 pages, www.springer.com/978-3-642-17865-8.
Office Action received in corresponding Australian Application No. 2013400747, dated Jun. 15, 2016.

* cited by examiner

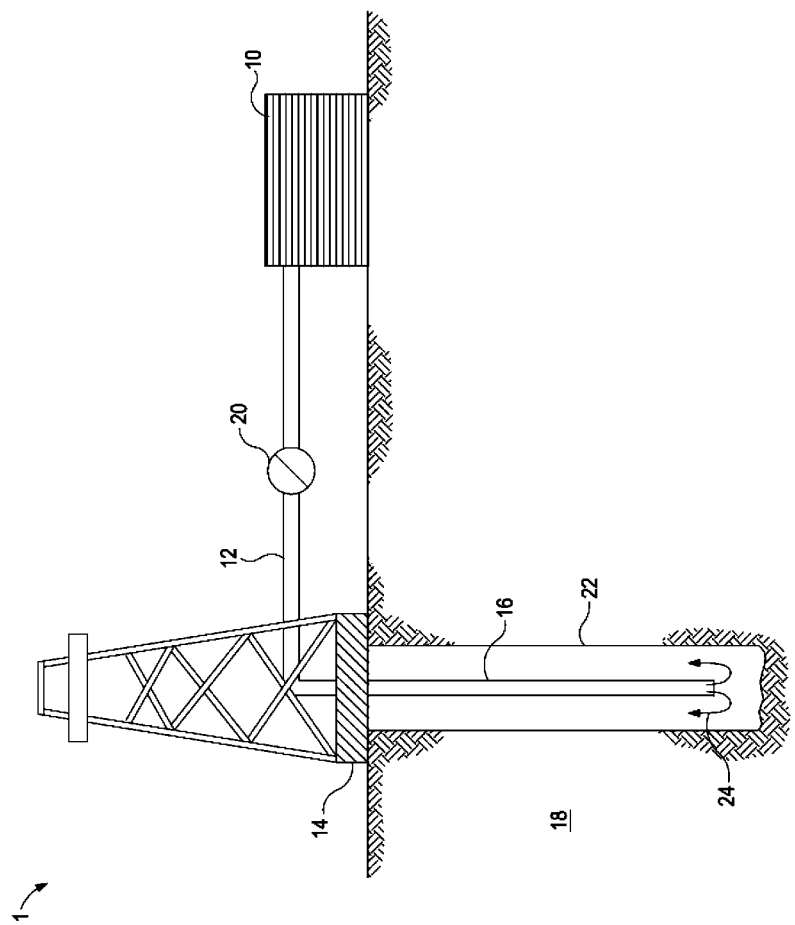

CEMENT BLENDS INCLUDING INERT MICROPARTICLES

BACKGROUND

The exemplary embodiments described herein relate to dry cement blends that include inert microparticles that produce cement slurries with a lower viscosity and a longer aging window, and methods relating thereto.

Settable compositions (e.g., cement slurries) are widely used in relation to the exploration and production of fluids from subterranean formations. For example, cement sheaths are used to support the wellbore. Also, cement plugs are used for isolating zones of a subterranean formation and for plugging the wellbore altogether when abandoned.

Cement slurries are often prepared at the well site just before performing a cementing operation because aging of the cement slurry causes the viscosity to rise to a point that the slurry is unpumpable. As used herein, a fluid is considered to be in a pumpable fluid state where the fluid has a viscosity of less than 70 Bc, as measured using an API approved HPHT (high pressure high temperature) cement consistometer, such as a FANN Model 165AT (available from FANN Instrument Company) at 140° F. (60° C.). Mixing of cement slurries at the well site requires mixing equipment and bulk storage for the components of the settable composition. Further, it requires transporting individual components to the well site. Equipment costs, transportation expenses, and cost of additional labor required to transport the equipment and to operate it can be high, especially when considering these expenses are incurred at every well site.

To mitigate these costs, extended life settable compositions have been developed to allow for a broader aging window (i.e., the time frame that the cement slurry is pumpable and suitable for use in cementing operations). The broader aging window allows for mixing of the cement slurry at another location and transporting it to the well site. Therefore, a single mixing location can be used for multiple well sites. Alternatively, the flexibility of preparing the slurry at the well site, days or weeks before it is needed provides opportunity to increase equipment and labor efficiencies. Additional expansion of this aging window and further reduction in the viscosity of cement slurries would be of additional value to those skilled in the art.

BRIEF DESCRIPTION OF THE DRAWINGS

The following FIGURES are included to illustrate certain aspects of the present invention, and should not be viewed as exclusive embodiments. The subject matter disclosed is capable of considerable modifications, alterations, combinations, and equivalents in form and function, as will occur to those skilled in the art and having the benefit of this disclosure.

FIG. 1 shows an illustrative schematic of a system that can deliver cement slurries described herein to a downhole location, according to one or more embodiments described herein.

DETAILED DESCRIPTION

The exemplary embodiments described herein relate to dry cement blends that include inert microparticles that produce cement slurries with a lower viscosity and a longer aging window, and methods relating thereto.

The inert microparticles utilized in conjunction with the cement slurries and methods described herein are at least about 3 times smaller than the cement particles of the cement slurry. Without being limited by theory, it is believed that because of their relative size, the inert microparticles act as mechanical dispersants that reduce the interactions between the cement particles that increase viscosity of the cement slurry. Accordingly, the viscosity of the cement slurry is initially lower with the inclusion of the inert microparticles. Further, upon aging, the relative increase in viscosity over time may decrease, which in combination with the lower initial viscosity, further expands the aging window. Expansion of the aging window may allow for implementation of off-site cement slurry mixing relative to well sites greater distances from mixing locations (e.g., off-shore well sites).

The lower viscosity of the cement slurry, initially or at a time in the aging window, makes the energy required to mix or pump the cement slurry less, further reducing costs relative to energy consumption and hardware as less expensive, lower horsepower pumps may be utilized.

Additionally, the inert microparticles acting as mechanical dispersants facilitate wetting of the solid components of the cement slurry with the wet components (e.g., water), which in turn improves the blending of the cement slurry into a homogeneous mixture.

It should be noted that when "about" is provided herein at the beginning of a numerical list, "about" modifies each number of the numerical list. It should be noted that in some numerical listings of ranges, some lower limits listed may be greater than some upper limits listed. One skilled in the art will recognize that the selected subset will require the selection of an upper limit in excess of the selected lower limit. Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the exemplary embodiments described herein. At the very least, and not as an attempt to limit the application of the doctrine of equivalents to the scope of the claim, each numerical parameter should at least be construed in light of the number of reported significant digits and by applying ordinary rounding techniques.

In some embodiments, a cement dry blend may comprise a plurality of cement particles and a plurality of inert microparticles, wherein the inert microparticles have an average diameter at least about 3 times smaller than that of the cement particles. As used herein, the term "inert" refers to a component of the composition that does not react with the other components of the mixture. For example, the inert microparticles are nonreactive with the other components of the dry cement blend and/or the cement slurry thereof.

Inert microparticles may include particles that are insoluble to slightly soluble (e.g., as identified in a CRC Handbook) in a basic fluid. Examples of inert microparticles may include, but are not limited to, manganese oxide, titanium dioxide, aluminum oxide, iron oxide, barium sulfate, sand, crystalline silica, rubber, polytetrafluoroethylene, and any combination thereof.

The inert microparticles may, in some embodiments, have an average diameter of about 3 times to about 100 times smaller than that of the cement particles, including subsets therebetween (e.g., 5 times to 100 times, 10 times to 100 times, or 5 times to 50 times). As used herein, the term "average diameter" refers to a D50 by volume. As used herein, the term "D50" refers to a diameter of which 50% of the particles in the sample are smaller.

In some embodiments, inert microparticles may have an average diameter of less than about 20 microns. In some embodiments, inert microparticles may have an average diameter of less than about 500 nm. In some embodiments, inert microparticles may have an average diameter ranging from a lower limit of about 10 nm, 50 nm, 100 nm, 250 nm, or 500 nm to an upper limit of about 20 microns, 15 microns, 10 microns, 5 microns, 1 micron, or 500 nm, and wherein the average diameter may range from any lower limit to any upper limit and encompasses any subset therebetween.

In some embodiments, the inert microparticles may be included in the cement dry blend in an amount ranging from a lower limit of about 0.5%, 1%, or 2% by weight of the cement particles to an upper limit of about 10%, 9%, 8%, 7%, 6%, 5%, 4%, 3%, or 2% by weight of the cement particles, and wherein the amount may range from any lower limit to any upper limit and encompasses any subset therebetween.

Examples of cement particles may include, but are not limited to, Portland cements, pozzolan cements, gypsum cements, high alumina content cements, slag cements, silica cements, and any combination thereof. Examples of Portland cements may include, but are not limited to, Portland cements classified as Classes A, C, H, and G according to American Petroleum Institute and their equivalent, Ordinary Portland cements of Type I, I/II, III, and V according to ASTM, including combinations thereof. Examples of pozzolan cements may include, but are not limited to, fly ash, silica fume, granulated blast furnace slag, calcined shale, opaline shale, pumice, pumicite, diatomaceous earth, volcanic ash, tuft, cement kiln dust, and any combination thereof.

In some embodiments, a cement dry blend may further comprise a basic material, which may react in combination with the cement particles to form a hardened mass. Examples of basic materials may include, but are not limited to, sodium hydroxide, sodium bicarbonate, sodium carbonate, lime, and combinations thereof.

In some embodiments, the basic material may be included in the cement dry blend in an amount ranging from a lower limit of about 1%, 5%, or 10% by weight of the cement particles to an upper limit of about 40%, 30%, or 20% by weight of the cement particles, and wherein the amount may range from any lower limit to any upper limit and encompasses any subset therebetween.

Water is mixed with the cement dry blend to yield a cement slurry. The water can be fresh water, salt water, seawater or brine.

In some embodiments, the water may be included in the cement slurry in an amount ranging from a lower limit of about 30%, 60%, or 80% by weight of the cement particles to an upper limit of about 150%, 125%, or 100% by weight of the cement particles, and wherein the amount may range from any lower limit to any upper limit and encompasses any subset therebetween. In some instances, the inert microparticles may enhance the fluidity of the cement slurry and allow for the production of pumpable cement slurries with reduced water concentrations. For example, the cement slurry may include about 80% or less water by weight of the cement particles, or more preferably about 65% or less water by weight of the cement particles.

In some embodiments, the cement slurry may further comprise a set retarding additive. As used herein, the term "set retarding additive" refers to an additive that retards the setting of the cement slurry. The set retarding additive may be included in the dry blend or mixed into the slurry.

Examples of set retarding additives may include, but are not limited to, phosphonic acid, phosphonic acid derivatives, salts, organic acids, carboxymethylated hydroxyethylated celluloses, synthetic co- or ter-polymers comprising sulfonate and carboxylic acid groups, ammonium lignosulfonates, metal salts of sulfoalkylated lignins, hydroxycarboxy acids, copolymers that comprise acrylic acid or maleic acid, oligosaccharides, and any combination thereof. One example of a suitable sulfoalkylate lignin comprises a sulfomethylated lignin. Examples of commercially available set retarding additives include HR® 4 (a calcium lignosulfonate derived from wood), HR® 5 (a chemically modified lignosulfonate), HR® 7 (a sodium lignosulfonate), HR® 12 (a mixture of HR® 4 retarder and an organic acid), HR® 15 (a mixture of HR® 5 retarder and an organic acid), HR® 25 (a high-temperature retarder/intensifier), HR® 601 (a lignin-based, cement-set retarder), SCR™ 100 (a nonlignosulfonate cement retarder), and SCR™ 500 (a synthetic high-temperature retarder), each of which are commercially available from Halliburton Energy Services, Inc.

In some embodiments, the set retarding additive may be included in the cement slurry in an amount ranging from a lower limit of about 0.1%, 0.5%, or 1% by weight of the cement particles to an upper limit of about 5%, 3%, or 2% by weight of the cement particles, and wherein the amount may range from any lower limit to any upper limit and encompasses any subset therebetween.

In some embodiments, the cement slurry may be stored for a period of time before introduction into a wellbore. In some instances, the storage time may be greater than one day, greater than four days, greater than seven days, or greater than 70 days. In some instances, the cement slurry has been observed to be storable for almost 2 years with no indication that it could not be stored for another 2 or more years.

The inert microparticles in the cement slurry may allow for longer storage times without the cement slurry becoming too viscous to pump. In some instances, the cement slurry may be stored (e.g., for a time period described herein), wherein upon remixing the viscosity of the cement slurry at 25 $s^{-1}$ at 80° F. (26.7° C.) is less than about 1,500 cP (including subsets thereof, e.g., about 10 cP to about 1,000 cP or about 50 cP to about 1,000 cP).

In some embodiments, a cement set accelerator may be added to the cement slurry prior to introduction into the wellbore. As used herein, the term "cement set accelerators" refers to the composition that activates the setting of the cement slurry. Example of cement set accelerators may include, but are not limited to, calcium chloride, triethanolamine, sodium silicate, zinc formate, calcium acetate, sodium sulfate, sodium hexametaphosphate, and any combination thereof. An example of a suitable sodium silicate is ECONOLITE™ additive, commercially available from Halliburton Energy Services, Inc.

The cement set accelerator should be added to the extended settable composition in an amount sufficient to activate the cement slurry to set into a hardened mass, in a desired amount of time, at a desired temperature and pressure. In certain embodiments, the cement set accelerator may be included in the cement slurry in an amount ranging from a lower limit of about 0.1%, 0.5%, or 1% by weight of the cement particles to an upper limit of about 10%, 5%, 3%, or 2% by weight of the cement particles, and wherein the amount may range from any lower limit to any upper limit and encompasses any subset therebetween.

In some embodiments, additives may be added to the cement slurry prior to introduction into the wellbore. Examples of additives may include, but are not limited to, a latex stabilizer, a defoamer, silica, a viscosifier, a weighting material, a fluid loss control additive, a set retarder, a weight reducing additive, a heavyweight additive, a lost circulation material, a filtration control additive, a dispersant, a suspending agent, latex cement, a thixotropic additive, and the like, and any combination thereof.

For example, some embodiments may involve managing the density of the cement slurry before introduction into the wellbore. For example, weight reducing additives like hollow glass beads, air (e.g., to form a foamed cement slurry), zeolites, perolite, and the like may be used to reduce the density of the cement slurry. In another example, heavyweight additives like hematite, barite, illite, and the like may be used to increase the density of the cement slurry.

In another example, some embodiments may involve modifying the rheology of the cement slurry before introduction into the wellbore (e.g., with a viscosifier or additional water).

Some embodiments may involve introducing a cement slurry described herein into a wellbore penetrating a subterranean formation. In some embodiments, the cement slurry may be placed in a desired location within the wellbore, the subterranean formation, or both and allowed to set therein. Examples of cementing operations suitable for implementing a cement slurry described herein may include, but are not limited to, primary cementing operations, secondary cementing operations, remedial cementing operations, plugging operations, and the like.

For example, the cement slurry may be placed in an annulus between the wellbore and a tubular disposed therein and allowed to set into a cement. In another example, the cement slurry may be placed in a microannulus formed between a tubular and a surrounding cement sheath and allowed to set therein. In yet another example, the cement slurry may be placed in a microannulus between a cement sheath disposed in the wellbore and the surrounding subterranean formation and allowed to set therein. In another example, the cement slurry may be placed in a gravel pack or a permeable portion of a subterranean formation and allowed to set therein so as to reduce or stop the fluid flow therethrough. In yet another example, the cement slurry may be placed into the wellbore or a tubular therein, and optionally into the subterranean formation proximal thereto, and allowed to set into a cement plug.

In various embodiments, systems configured for preparing, transporting, and delivering the cement slurries described herein to a downhole location are described. In various embodiments, the systems can comprise a pump fluidly coupled to a tubular (e.g., a casing, drill pipe, production tubing, coiled tubing, etc.) extending into a wellbore penetrating a subterranean formation, the tubular may be configured to circulate or otherwise convey a cement slurry comprising water and a cement dry blend comprising a plurality of hydraulic cement particles and a plurality of inert microparticles, wherein the inert microparticles have an average diameter at least about 3 times smaller than that of the hydraulic cement particles. The pump may be, for example, a high pressure pump or a low pressure pump, which may depend on, inter alia, the viscosity and density of the cement slurry, the type of the cementing operation, and the like.

In some embodiments, the systems described herein may further comprise a mixing tank arranged upstream of the pump and in which the cement slurry is formulated. In various embodiments, the pump (e.g., a low pressure pump, a high pressure pump, or a combination thereof) may convey the cement slurry from the mixing tank or other source of the cement slurry to the tubular. In other embodiments, however, the cement slurry can be formulated offsite and transported to a worksite, in which case the cement slurry may be introduced to the tubular via the pump directly from a transport vehicle or a shipping container (e.g., a truck, a railcar, a barge, or the like) or from a transport pipeline. In yet other embodiments, the cementing fluid may be formulated on the fly at the well site where components of the cementing fluid are pumped from a transport (e.g., a vehicle or pipeline) and mixed during introduction into the tubular. In any case, the cement slurry may be drawn into the pump, elevated to an appropriate pressure, and then introduced into the tubular for delivery downhole. In another embodiment, the cementing fluid may be mixed in a container at the well site and stored for a period of time before pumping downhole.

FIG. 1 shows an illustrative schematic of a system that can deliver cement slurries described herein to a downhole location, according to one or more embodiments. It should be noted that while FIG. 1 generally depicts a land-based system, it is to be recognized that like systems may be operated in subsea locations as well. As depicted in FIG. 1, system 1 may include mixing tank 10, in which a cement slurry described herein may be formulated. Again, in some embodiments, the mixing tank 10 may represent or otherwise be replaced with a transport vehicle or shipping container configured to deliver or otherwise convey the cementing fluid to the well site. The cement slurry may be conveyed via line 12 to wellhead 14, where the cement slurry enters tubular 16 (e.g., a casing, drill pipe, production tubing, coiled tubing, etc.), tubular 16 extending from wellhead 14 into wellbore 22 penetrating subterranean formation 18. Upon being ejected from tubular 16, the cement slurry may subsequently return up the wellbore in the annulus between the tubular 16 and the wellbore 22 as indicated by flow lines 24. In other embodiments, the cementing fluid may be reverse pumped down through the annulus and up tubular 16 back to the surface, without departing from the scope of the disclosure. Pump 20 may be configured to raise the pressure of the cement slurry to a desired degree before its introduction into tubular 16 (or annulus). It is to be recognized that system 1 is merely exemplary in nature and various additional components may be present that have not necessarily been depicted in FIG. 1 in the interest of clarity. Non-limiting additional components that may be present include, but are not limited to, supply hoppers, valves, condensors, adapters, joints, gauges, sensors, compressors, pressure controllers, pressure sensors, flow rate controllers, flow rate sensors, temperature sensors, and the like.

One skilled in the art, with the benefit of this disclosure, should recognize the changes to the system described in FIG. 1 to provide for other cementing operations (e.g., squeeze operations, reverse cementing (where the cement is introduced into an annulus between a tubular and the wellbore and returns to the wellhead through the tubular), and the like).

It is also to be recognized that the disclosed cement slurries may also directly or indirectly affect the various downhole equipment and tools that may come into contact with the treatment fluids during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), wellbore projectiles (e.g., wipers, plugs, darts, balls, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIG. 1.

Embodiments disclosed herein include:

A. a method that includes providing a cement dry blend comprising a plurality of cement particles and a plurality of inert microparticles, wherein the inert microparticles have an average diameter at least about 3 times smaller than that of the average diameter of the cement particles; mixing water, a set retarding additive, and the cement dry blend to yield a cement slurry; storing the cement slurry; mixing a cement set accelerator into the cement slurry; introducing the cement slurry into a wellbore penetrating a subterranean formation; and allowing the cement slurry to set at a location within the wellbore, the subterranean formation, or both;

B. a method that includes providing a cement dry blend comprising a plurality of cement particles and a plurality of inert microparticles, wherein the inert microparticles have an average diameter at least about 3 times smaller than that of the average diameter of the cement particles, and wherein the inert microparticles have an average diameter of about 10 nm to about 20 microns; mixing water, a set retarding additive, and the cement dry blend to yield a cement slurry; storing the cement slurry for a time greater than about 1 day; mixing a cement set accelerator into the cement slurry, wherein the cement slurry has an apparent viscosity measured at a shear rate of 25 s$^{-1}$ of less than 1,500 cP; introducing the cement slurry into a wellbore penetrating a subterranean formation; and allowing the cement slurry to set at a location within the wellbore, the subterranean formation, or both; and C. providing a cement dry blend comprising a plurality of cement particles, a basic material, and a plurality of inert microparticles, wherein the inert microparticles have an average diameter at least about 3 times smaller than that of the average diameter of the cement particles, wherein the inert microparticles have an average diameter of about 10 nm to about 20 microns, and wherein the inert microparticle is present in the cement dry blend in an amount of about 0.5% to 10% by weight of the cement particles; mixing water, a set retarding additive, and the cement dry blend to yield a cement slurry, wherein the cement slurry includes about 30% to about 80% water by weight of the cement particles; storing the cement slurry for a time greater than about 1 day; mixing a cement set accelerator into the cement slurry, wherein the cement slurry has an apparent viscosity measured at a shear rate of 25 s$^{-1}$ of less than 1,500 cP; introducing the cement slurry into a wellbore penetrating a subterranean formation; and allowing the cement slurry to set at a location within the wellbore, the subterranean formation, or both.

Each of embodiments A, B, and C may have one or more of the following additional elements in any combination: Element 1: wherein the inert microparticles are present in the cement dry blend in an amount of about 0.5% to about 10% by weight of the cement particles; Element 2: wherein the inert microparticles have an average diameter of about 10 nm to about 20 microns; Element 3: wherein the inert microparticles have an average diameter of about 10 nm to about 5 microns; Element 4: wherein the cement dry blend further comprises a basic material in an amount of about 1% to about 40% by weight of the cement particles; Element 5: wherein the cement slurry includes about 30% to about 150% water by weight of the cement particles; Element 6: wherein the cement slurry includes about 30% to about 80% water by weight of the cement particles; Element 7: wherein storing the cement slurry is for a time greater than about 1 day; Element 8: wherein storing the cement slurry is for a time greater than about 4 days; Element 9: wherein storing the cement slurry is for a time greater than about 7 days; Element 10: wherein storing the cement slurry is for a time greater than about 70 days; Element 11: wherein after storing the cement slurry has an apparent viscosity measured at a shear rate of 25 s$^{-1}$ of less than 1,500 cP; Element 12: wherein the location is an annulus between the wellbore and a tubular disposed within the wellbore; Element 13: wherein the location is a microannulus between a tubular and a cement sheath disposed in the wellbore; Element 14: wherein the location is a microannulus between the subterranean formation and a cement sheath disposed in the wellbore; Element 15: wherein the location is a gravel pack disposed within a portion of the wellbore; Element 16: wherein the location is a permeable portion of the subterranean formation; and Element 17: wherein the location is a portion of the wellbore or a tubular disposed therein and, optionally, a proximal portion of the subterranean formation such that upon setting a cement plug is formed.

By way of non-limiting example, exemplary combinations applicable to A, B, C include: at least two of Elements 1, 4, or 11 in combination; at least one of Elements 1, 4, or 11 in combination with Element 2 or Element 3; at least one of Elements 1, 4, or 11 in combination with Element 5 or Element 6 optionally in further combination with Element 2 or Element 3; one of Elements 7-10 in combination with any of the foregoing; and at least one of Elements 10-17 in combination with any of the foregoing.

Another embodiment disclosed herein is a system that comprises a pump fluidly coupled to a tubular extending into a wellbore penetrating a subterranean formation, wherein the tubular is configured to circulate or otherwise convey a cement slurry provided for or produced in one of Embodiments A, B, and C optionally with at least one of Elements 1-17. The system may further comprises a mixing tank arranged upstream of the pump and in which the cement slurry is formulated. Additional, optional components of the system are described herein (e.g., a pump for transporting a material from a transportation vehicle to the mixing tank, a wellhead, at least one storage tank, and so on).

One or more illustrative embodiments incorporating the invention embodiments disclosed herein are presented herein. Not all features of a physical implementation are described or shown in this application for the sake of clarity. It is understood that in the development of a physical embodiment incorporating the embodiments of the present invention, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for those of ordinary skill the art and having benefit of this disclosure.

To facilitate a better understanding of the present invention, the following examples of preferred or representative embodiments are given. In no way should the following examples be read to limit, or to define, the scope of the invention.

EXAMPLES

Two cement slurries were prepared with the compositions provided in Table 1 where "% bwoc" refers to percent by weight of cement. The rheological properties of the cement slurries at 80° F. (26.7° C.) was measured over a period of days, Table 2.

TABLE 1

|  | Slurry 1 | Slurry 2 |
| --- | --- | --- |
| Pumice | 100% bwoc | 100% bwoc |
| Hydrated Lime | 20% bwoc | 20% bwoc |
| Liquiment 5581F (a synthetic dispersant, available from BASF) | 0.6% bwoc | 0.6% bwoc |
| $Mn_2O_3$ Particles (average diameter about 4 microns) | — | 2.0% bwoc |
| MMCR Retarder (a liquid retarder, available from Halliburton) | 0.7% bwoc | 1.3% bwoc |
| Water | 60% bwoc | 65% bwoc |

TABLE 2

| | | No. 1 Spring Fann Viscometer Readings | | | | |
| --- | --- | --- | --- | --- | --- | --- |
| Slurry | Days | 300 | 200 | 100 | 6 | 3 |
| 1 | 0 | 276 | 184 | 69 | 4 | 3 |
| 1 | 1 | 300+ | 214 | 90 | 3 | 1 |
| 1 | 4 | 254 | 148 | 69 | 7 | 5 |
| 2 | 0 | 64 | 42 | 55 | 5 | 5 |
| 2 | 1 | 67 | 44 | 24 | 5 | 5 |
| 2 | 4 | 75 | 52 | 32 | 11 | 10 |
| 2 | 5 | 78 | 57 | 39 | 22 | 21 |
| 2 | 6 | 86 | 65 | 46 | 30 | 30 |
| 2 | 8 | 101 | 86 | 70 | 60 | 60 |

Example 2

Two cement slurries were prepared with the compositions provided in Table 3. The rheological properties of the cement slurries at 80° F. (26.7° C.) was measured over a period of days, Table 4.

TABLE 3

|  | Slurry 3 | Slurry 4 |
| --- | --- | --- |
| Pumice (average diameter about 14 microns) | 100% bwoc | 100% bwoc |
| Hydrated Lime | 20% bwoc | 20% bwoc |
| Liquiment 5581F | 0.25% bwoc | 0.25% bwoc |
| $Mn_2O_3$ Particles (average diameter about 4 microns) | — | 2.0% bwoc |
| MMCR Retarder | 1.25% bwoc | 1.25% bwoc |
| Water | 60.3% bwoc | 60.3% bwoc |

TABLE 4

| | | No. 1 Spring Fann Viscometer Readings (FYSA) | | | | | | |
| --- | --- | --- | --- | --- | --- | --- | --- | --- |
| Slurry | Days | 600 | 300 | 200 | 100 | 6 | 3 | VAV* | YP (lbf/100 ft^2) |
| 3 | 0 | 152 | 102.5 | 84.5 | 69 | 49.5 | 49 | 1794 | 66 |
| 3 | 1 | 153 | 102.5 | 84.5 | 66.5 | 44.5 | 44 | 1729 | 60 |
| 3 | 7 | 196 | 133.5 | 111.5 | 87.5 | 59.5 | 58.5 | 2275 | 77 |
| 4 | 0 | 98 | 48 | 36.5 | 26 | 16 | 15.5 | 819 | 19 |
| 4 | 1 | 94 | 50.5 | 38.5 | 28 | 16 | 15.5 | 715 | 18 |
| 4 | 7 | 106 | 59 | 46.5 | 35 | 21.5 | 21.5 | 910 | 26 |

*VAV = volume average viscosity at 100 rpm in centipoise.

Example 3

Two cement slurries were prepared with the compositions provided in Table 5. The rheological properties of the cement slurries at 80° F. (26.7° C.) were measured after mixing, Table 6.

TABLE 5

|  | Slurry 5 | Slurry 6 |
| --- | --- | --- |
| Class H Cement | 100% bwoc | 100% bwoc |
| Water | 45% bwoc | 45% bwoc |
| $Mn_2O_3$ Particles (average diameter about 4 microns) | — | 2.0% bwoc |

TABLE 6

| | No. 1 Spring Fann Viscometer Readings | | | | | | | |
| --- | --- | --- | --- | --- | --- | --- | --- | --- |
| Slurry | 600 | 300 | 200 | 100 | 6 | 3 | VAV* | YP (lbf/100 ft^2) |
| 5 | 99 | 65 | 49 | 33.5 | 11.5 | 8.5 | 871 | 7.3 |
| 6 | 67 | 44 | 36 | 26.5 | 12.5 | 9.5 | 689 | 8.0 |

*VAV = volume average viscosity at 100 rpm in centipoise, which represents a shear rate of about 25 1/sec.

These example illustrates that inclusion of inert microparticles yields a cement slurry with lower viscosity than cement slurries without such particles (e.g., when comparing the rheometer values at 300 or the VAV* values), which, in turn, reduces the energy required to pump the slurry into a desired location in a wellbore and/or subterranean formation. Further, the cement slurries with inert microparticles may be aged or stored for extended periods of time with minimal increases in viscosity, such that the cement slurry is still pumpable.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

The invention claimed is:

1. A method comprising:
   providing a cement dry blend consisting of a plurality of cement particles and a plurality of inert microparticles, wherein the inert microparticles have an average diameter at least about 3 times smaller than the average diameter of the cement particles and the inert microparticles are selected from the group consisting of manganese oxide, titanium dioxide, iron oxide, barium sulfate, polytetrafluoroethylene, and any combination thereof, wherein the average diameter of the inert microparticles is from about 10 nm to about 20 microns;
   mixing water, a set retarding additive, and the cement dry blend to yield a cement slurry consisting of the water, the set retarding additive, the plurality of cement particles, and the plurality of inert microparticles;
   storing the cement slurry;
   mixing a cement set accelerator into the cement slurry;
   introducing the cement slurry into a wellbore penetrating a subterranean formation; and
   allowing the cement slurry to set at a location within the wellbore, the subterranean formation, or both.

2. The method of claim 1, wherein the inert microparticles are present in the cement dry blend in an amount of about 0.5% to about 10% by weight of the cement particles.

3. The method of claim 1, wherein the average diameter of the inert microparticles is from about 10 nm to about 5 microns.

4. The method of claim 1, wherein the cement slurry includes the water in an amount from about 30% to about 150% by weight of the cement particles.

5. The method of claim 1, wherein the cement slurry includes the water in an amount from about 30% to about 80% by weight of the cement particles.

6. The method of claim 1, wherein the storing is for a time greater than about 1 day.

7. The method of claim 1, wherein after the storing, the cement slurry has an apparent viscosity measured at a shear rate of 25 s$^{-1}$ of less than 1,500 cP.

8. The method of claim 1, wherein the location is an annulus between the wellbore and a tubular disposed within the wellbore.

9. The method of claim 1, wherein the location is a microannulus between a tubular and a cement sheath disposed in the wellbore.

10. The method of claim 1, wherein the location is a microannulus between the subterranean formation and a cement sheath disposed in the wellbore.

11. The method of claim 1, wherein the location is a gravel pack disposed within a portion of the wellbore.

12. The method of claim 1, wherein the location is a permeable portion of the subterranean formation.

13. The method of claim 1, wherein the location is a portion of the wellbore or a tubular disposed therein, and a proximal portion of the subterranean formation such that the cement slurry sets to form a cement plug.

14. A method comprising:
    providing a cement dry blend consisting of a plurality of cement particles and a plurality of inert microparticles, wherein the inert microparticles have an average diameter at least about 3 times smaller than the average diameter of the cement particles and the inert microparticles are selected from the group consisting of manganese oxide, titanium dioxide, iron oxide, barium sulfate, polytetrafluoroethylene, and any combination thereof, and wherein the average diameter of the inert microparticles is from about 10 nm to about 20 microns;
    mixing water, a set retarding additive, and the cement dry blend to yield a cement slurry consisting of the water, the set retarding additive, the plurality of cement particles, and the plurality of inert microparticles;
    storing the cement slurry for a time greater than about 1 day;
    mixing a cement set accelerator into the cement slurry, wherein the cement slurry has an apparent viscosity measured at a shear rate of 25 s$^{-1}$ of less than 1,500 cP;
    introducing the cement slurry into a wellbore penetrating a subterranean formation; and
    allowing the cement slurry to set at a location within the wellbore, the subterranean formation, or both.

15. The method of claim 14, wherein the inert microparticles are present in the cement dry blend in an amount of about 0.5% to about 10% by weight of the cement particles.

16. The method of claim 14, wherein the cement slurry includes the water in an amount from about 30% to about 80% by weight of the cement particles.

17. A method comprising:
    providing a cement dry blend consisting of a plurality of cement particles, a plurality of inert microparticles in an amount of about 0.5% to 10% by weight of the cement particles, and a basic material in an amount of about 1% to about 40% by weight of the cement particles, wherein the basic material is selected from the group consisting of sodium hydroxide, sodium bicarbonate, sodium carbonate, lime, and combinations thereof, and wherein the inert microparticles have an average diameter at least about 3 times smaller than the average diameter of the cement particles;
    mixing water, a set retarding additive, and the cement dry blend to yield a cement slurry consisting of the water, the set retarding additive, the plurality of cement particles, the plurality of inert microparticles, and the basic material;
    storing the cement slurry;
    then, mixing a cement set accelerator into the cement slurry to yield an activated cement slurry such that the activated cement slurry consists of the water, the set retarding additive, the plurality of cement particles, the plurality of inert microparticles, the basic material, and the cement set accelerator;

introducing the activated cement slurry into a wellbore penetrating a subterranean formation; and allowing the activated cement slurry to set at a location within the wellbore, the subterranean formation, or both.

\* \* \* \* \*